Dec. 29, 1970 — R. J. PERRONE — 3,551,542
MARKING METHOD FOR ELECTRIC CABLE
Filed April 5, 1968

INVENTOR.
ROSARIO J. PERRONE
BY V-7. Voelk
HIS AGENT

United States Patent Office 3,551,542
Patented Dec. 29, 1970

3,551,542
MARKING METHOD FOR ELECTRIC CABLE
Rosario J. Perrone, Marion, Ind., assignor to Anaconda Wire and Cable Company, a corporation of Delaware
Filed Apr. 5, 1968, Ser. No. 719,201
Int. Cl. B29c 25/00; B29f 3/10; B29h 5/28
U.S. Cl. 264—166                                    7 Claims

ABSTRACT OF THE DISCLOSURE

Extruded articles such as electric cable jackets that are vulcanized under heat and pressure in a continuous process are permanently marked during the extrusion and vulcanizing operation by expressing the extrudate through two dies, with only a thin layer being applied by the final die. An embossed tape is applied to the surface ahead of the second die with the result that the outer extrusion covers both the tape and the inner layer. After vulcanization the tape is separated, tearing away the portion of the outer layer that covers it.

BACKGROUND OF THE INVENTION

Field of the invention

This invention relates to processes of continuous extrusion and vulcanization and a method of marking the extruded article during its manufacture. It relates particularly to electric cables with extruded jackets that have markings vulcanized into their surface.

Description of the prior art

Elongated articles that are manufactured by expressing a vulcanizable polymer through an extrusion die have, generally, been made by three different methods as follows. In one method the extrudate has been collected in a pan or on a reel, placed in a pressure chamber and vulcanized in the chamber. This method has not resulted in satisfactory vulcanized markings because any legends impressed in the soft extrudate become blurred before vulcanization. In a second method the extrudate has been covered by a pressure confining layer, such as a lead sheath and heated to cause vulcanization. For purposes of marking, an embossed tape was often applied along with, and covered by, the sheath. This method resulted in excellent vulcanized markings but the vulcanization method itself has been superceded because of its complexity and high cost by a third vulcanization method to be described. In the third method, called "continuous vulcanization," the extrudate passes directly and continuously from an extrusion die into a tube of pressurized steam where vulcanization takes place. Prior to the present invention no satisfactory method had been found to make vulcanized markings on articles produced by continuous extrusion and vulcanization. In Patent 2,867,001 it has been suggested to include embossing wheels within the vulcanization chamber itself. Such an apparatus is mechanically complex and requires that the steam chamber be opened to change the marking wheel every time it is desired to alter the legend. In addition the marking itself was limited to repetitions of a legend that could fit on a wheel small enough to be included in the vulcanizing chamber.

SUMMARY

By means of my invention I can combine the economy and speed of continuous extrusion with the good markings formerly only possible with vulcanization in lead.

By means of my invention I can apply an easily located vulcanized legend, of any desired length and complexity and protected against abrasion, to an extrudate.

By means of my invention I can apply a marking to a vulcanized extrudate during the extrusion operation without going through an extra process.

My method of forming and vulcanizing a marking on the surface of an elongated extrudate, such, for a preferred example, as a jacket of an electric cable, comprises the steps of forming the extrudate by expressing a vulcanizable polymeric composition, such, for example, as neoprene, through an extrusion die, and continuously overlaying the unvulcanized surface of extrudate with an elongated strip bearing marking impressions. I then express a thin layer of the same composition over both the extrudate and the marking strip, thereafter directly passing the extrudate through a pressurized, heated vulcanization chamber and therein vulcanizing both the extrudate and the outer layer. I then lift the strip and the portion of the layer of composition immediately covering the strip from the underlying extrudate to expose the markings. The layer of composition expressed over the extrudate should have a thickness of 5–40 and preferably 10–25 mils.

An electric cable made to my invention comprises a core and a vulcanized, extruded, polymeric jacket surrounding the core. This jacket comprises an inner layer and a substantially thinner outer layer such as one 10–25 mils thick. My cable comprises impressions of markings vulcanized continuingly on a longitudinal band of the inner layer and walls in the outer layer bordering both edges of the band. The band is free from the outer layer thereby exposing the impressions.

DESCRIPTION OF THE PREFERRED EMBODIMENT

Figures 1, 2:
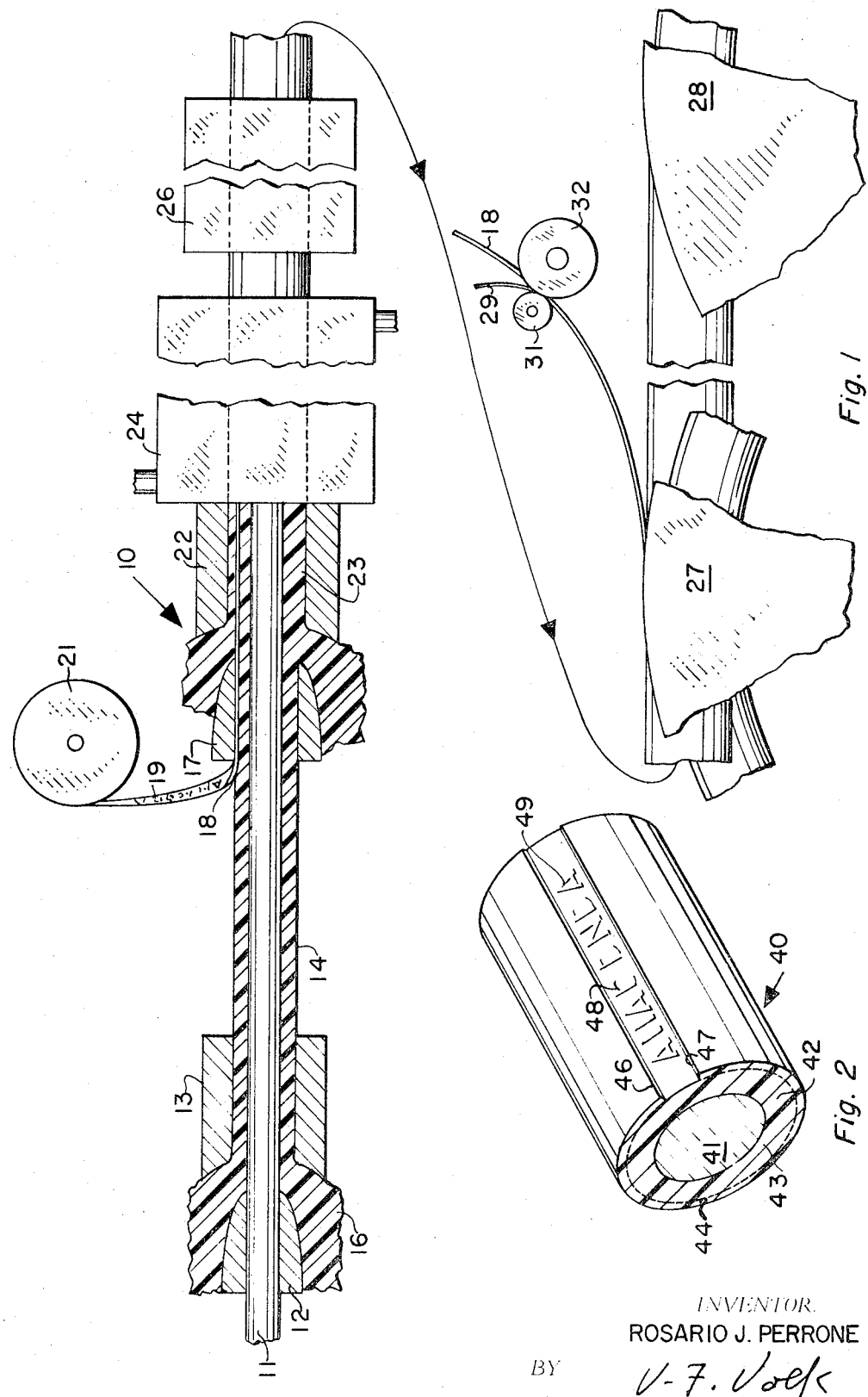
FIG. 1 shows the steps of the method of my invention.
FIG. 2 shows a pictorial view of a cable made to my invention.

Referring to FIG. 1 a cable core 11 is being paid in a known manner through a guider 12 of a rubber extruder indicated generally by the numeral 10 into a die 13 where it receives as an extrudate a jacket 14 from a supply of jacketing stock 16 such as neoprene which is being expressed into the die by urging means such as an extruder worm of which many types are known and for which I claim no novelty. After leaving the die 13 the core 11, with jacket extrudate 14, enters another tubular guider 17 along with a strip 18 on which there has been embossed a legend 19. The strip 18 is supplied from a coil 21 mounted external to the extruder 10 into which it is paid through openings in the extruder casing, not shown. Although the legend 19 may merely be repeated at intervals on the strip 18 it is an advantage of my method that the strip may be embossed with legends in the form of non-repetitive indicia such as footage markings, or with lengthy instructions.

As the strip 18 and the core 11 leave the guider 17 the strip is flat against the extrudate 14 and for this purpose the strip may be curved in section to match the circumference of the jacket. Usually the material of the strip 18 is metallic but relatively rigid high-temperature plastics may also be used within the scope of my invention. Where a plastic is used it should preferably be reinforced with longitudinal glass fibers so that it will have sufficient strength to be torn out of the jacket in a later step to be described.

The core bearing the strip 18 now passes into a second die 22 where it is coated with a thin layer of the composition 16 expressed into the die 22 to form an outer layer 23. It is an essential feature of my invention that the layer 23 should bond so firmly to the extrudate 14 during the vulcanization step to be described that it can be considered to be integral with the extrudate in forming a single jacket. However it is not essential to my invention that the composition of the outer layer be identical to the composition of the extrudate so long as the two form an integral bond, so that when the strip 18 is lifted from the cured article the outer layer will tear at the edges of the strip rather than separating from the underlying extrudate.

I have shown the guiders 12, 17 and dies 13, 22 all to be separate structures but my invention can be practiced where the die 13 and guider 17 are combined. In this case a slot is provided through the die-guider wall to introduce the strip 18. After leaving the die 22 the core 11 with its extruded coverings passes into a heated, pressurized vulcanizing tube 24 of known type where the layers 14 and 23 are cured to form an integral sheath over the core 11. The tube 24 contains pressurized steam which is in direct contact with the outer surface of the layer 23, but in conformance with modern vulcanizing practice the downstream end of the tube 24 may be filled with pressurized water which will have the effect of cooling the vulcanized layers before they leave the vulcanizing tube. Upon leaving the vulcanizer 24 the core passes through an optional cooling trough 26 after which it is passed around a capstan 27 and onto a reel 28. The strip 18 however is torn from the surface of the vulcanized extrudate 14 along with a ribbon 29 of the overlying portion of the layer 23, by means of pinch rolls 31, 32. To facilitate the removal of the ribbon 29 its edges can be scored in a known manner by cutting wheels (not shown) but I have found that a neoprene layer up to 25 mils thick can be removed along with the strip 18 in a satisfactory clean tear without scoring. Upon leaving the pinch rolls 31, 32 the strip 18 may be taken up on a reel for reuse while the ribbon 29 is discarded, however the strip 18 may be a lead alloy in which case it may be merely salvaged for remelting.

In FIG. 2 an electric cable, indicated generally by the numeral 40 has a core 41 surrounded by a protective jacket 42 of a tough, vulcanized material such as neoprene. The core 41 may comprise an assembly of insulated conductors, or a single conductor. I have shown the core 41 to be circular in section but it will be understood that it may be flat within the scope of my invention, as in the case where the core is comprised of 2 or 3 conductors laid parallel. The jacket 42 may be considered to be made up of two portions, an inner extrudate 43 and an outer extruded layer 44 although an interface between the layers 43, 44 will, in most cases be absent and the jacket 42 will be homogeneous. The surface of the jacket 42 is broken by two radial walls 46, 47 having a depth equal to the thickness of the layer 44 that was formed when a strip, such as the strip 18 was torn from the cable, carrying with it a ribbon of the overlying layer 44 and exposing a band 49 of the surface of the extrudate 43. The surface bears impressions 48 of markings forming a legend to identify the cable or serving other purposes such as length marking. The walls 46, 47 protect the impressions 48 from abrasion and clearly identify the portion of the cable upon which the markings may be found.

The foregoing description has been exemplary rather than definitive and other embodiments will be included in the invention for which I desire an award of Letters Patent as defined in the following claims.

I claim:

1. The method of forming and vulcanizing markings on the surface of an elongated extrudate comprising the steps of:
    (A) continuously forming said extrudate by expressing a vulcanizable polymeric composition through an extrusion die,
    (B) continuously overlaying the surface of said extrudate with an elongated strip bearing marking impressions,
    (C) continuously expressing over said extrudate and said strip a thin layer of polymeric composition,
    (D) directly and continuously passing said extrudate through a pressurized, heated vulcanization chamber, therein vulcanizing said extrudate and said layer,
    (E) lifting said strip and the portion only of said layer immediately covering said strip from said extrudate thereby exposing said markings.

2. The method of claim 1 wherein said extrudate comprises the jacket of an electric cable.

3. The method of claim 1 wherein said extrudate is neoprene.

4. The method of claim 1 wherein the thickness of said layer is 5–40 mils.

5. The method of claim 1 wherein the thickness of said layer is 10–25 mils.

6. The method of claim 1 wherein the compositions of said extrudate and said layer are identical.

7. The method of claim 1 wherein said chamber contains high-pressure steam.

References Cited

UNITED STATES PATENTS

| 2,001,491 | 5/1935 | Hendey | 264—174 |
| 2,251,047 | 7/1941 | Gangloff | 264—171 |
| 3,071,809 | 1/1963 | Lerch | 264—174 |
| 3,113,934 | 12/1963 | Grossman | 264—174 |

ROBERT F. WHITE, Primary Examiner

J. R. THURLOW, Assistant Examiner

U.S. Cl. X.R.

40—308, 316; 264—174, 236